United States Patent
Pillai et al.

(10) Patent No.: US 11,316,837 B2
(45) Date of Patent: Apr. 26, 2022

(54) SUPPORTING UNKNOWN UNICAST TRAFFIC USING POLICY-BASED ENCRYPTION VIRTUALIZED NETWORKS

(71) Applicant: Nicira, Inc., Palo Alto, CA (US)

(72) Inventors: Sanal Pillai, Sunnyvale, CA (US); Calvin Qian, Fremont, CA (US); Gang Xu, Palo Alto, CA (US); Bin Zan, Palo Alto, CA (US); Ganesan Chandrashekhar, Campbell, CA (US)

(73) Assignee: Nicira, Inc., Palo Alto, CA (US)

( * ) Notice: Subject to any disclaimer, the term of this patent is extended or adjusted under 35 U.S.C. 154(b) by 58 days.

(21) Appl. No.: 16/661,967

(22) Filed: Oct. 23, 2019

(65) Prior Publication Data

US 2020/0067889 A1 Feb. 27, 2020

Related U.S. Application Data

(63) Continuation of application No. 15/675,482, filed on Aug. 11, 2017, now Pat. No. 10,476,850.

(60) Provisional application No. 62/534,565, filed on Jul. 19, 2017.

(51) Int. Cl.

| | |
|---|---|
| *H04L 29/06* | (2006.01) |
| *H04L 45/16* | (2022.01) |
| *H04L 9/08* | (2006.01) |
| *H04L 9/14* | (2006.01) |
| *H04L 12/46* | (2006.01) |

(Continued)

(52) U.S. Cl.
CPC ........ *H04L 63/0428* (2013.01); *H04L 9/0841* (2013.01); *H04L 9/0861* (2013.01); *H04L 9/0894* (2013.01); *H04L 9/14* (2013.01); *H04L 12/4633* (2013.01); *H04L 12/4641* (2013.01); *H04L 45/16* (2013.01); *H04L 45/66* (2013.01); *H04L 61/6022* (2013.01); *H04L 63/0272* (2013.01); *H04L 63/061* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 6,556,541 B1 * | 4/2003 | Bare | H04L 12/185 370/235 |
| 7,234,063 B1 * | 6/2007 | Baugher | H04L 9/0833 380/259 |

(Continued)

OTHER PUBLICATIONS

No stated author; Networking Fundamentals for Dante; 2015; Retrieved from the Internet <URL: https://www.audio-technica.com/cms/resource_library/files/89301711029b9788/networking_fundamentals_for dante.pdf>; pp. 1-18, as printed. (Year: 2015).

*Primary Examiner* — Michael W Chao
(74) *Attorney, Agent, or Firm* — Patterson & Sheridan, LLP

(57) ABSTRACT

Certain embodiments described herein are generally directed to enabling a group of host machines within a network to securely communicate an unknown unicast packet. In some embodiments, a key policy is defined exclusively for the secure communication of unknown unicast packets. The key policy is transmitted by a central controller to the group of host machines for negotiating session keys among each other when communicating unknown unicast packets.

20 Claims, 4 Drawing Sheets

(51) Int. Cl.
  *H04L 45/00*        (2022.01)
  *H04L 101/622*      (2022.01)

(56) References Cited

U.S. PATENT DOCUMENTS

| | | | |
|---|---|---|---|
| 7,366,894 B1* | 4/2008 | Kalimuthu | H04L 63/0272 713/153 |
| 7,536,548 B1* | 5/2009 | Batke | H04L 63/061 713/166 |
| 7,864,762 B2* | 1/2011 | Carrasco | H04L 63/0272 370/389 |
| 8,259,563 B1 | 9/2012 | Kothari et al. | |
| 8,295,291 B1 | 10/2012 | Ramanathan et al. | |
| 8,429,647 B2 | 4/2013 | Zhou et al. | |
| 8,601,133 B1 | 12/2013 | Rainovic et al. | |
| 8,953,590 B1 | 2/2015 | Aggarwal et al. | |
| 9,391,885 B1 | 7/2016 | Shukla et al. | |
| 9,755,965 B1 | 9/2017 | Yadav et al. | |
| 9,930,066 B2 | 3/2018 | Chopra et al. | |
| 10,083,026 B1 | 9/2018 | Venkata et al. | |
| 10,200,278 B2* | 2/2019 | Appanna | H04L 12/4633 |
| 10,218,526 B2* | 2/2019 | Shen, IV | H04L 12/1886 |
| 10,237,090 B2* | 3/2019 | Josyula | H04L 12/4633 |
| 10,445,509 B2 | 10/2019 | Thota et al. | |
| 10,476,850 B2 | 11/2019 | Pillai et al. | |
| 10,523,466 B1* | 12/2019 | Sivaraj | H04L 61/1547 |
| 10,778,651 B2 | 9/2020 | Gunda et al. | |
| 10,798,073 B2 | 10/2020 | Jahid et al. | |
| 10,841,216 B1* | 11/2020 | Hoang | H04L 12/462 |
| 10,981,656 B2 | 4/2021 | Parker et al. | |
| 11,018,898 B2* | 5/2021 | Chu | H04L 45/245 |
| 11,018,993 B2 | 5/2021 | Chandrashekhar et al. | |
| 11,032,248 B2 | 6/2021 | Kumar et al. | |
| 11,115,375 B2* | 9/2021 | Fernando | H04L 41/0806 |
| 11,133,947 B2* | 9/2021 | Banerjee | H04L 12/18 |
| 11,165,687 B2* | 11/2021 | Zeng | H04L 47/41 |
| 2003/0131245 A1 | 7/2003 | Linderman | |
| 2003/0135753 A1 | 7/2003 | Batra et al. | |
| 2003/0174706 A1* | 9/2003 | Shankar | H04L 29/12009 370/393 |
| 2003/0191937 A1* | 10/2003 | Balissat | H04L 63/065 713/163 |
| 2004/0093492 A1 | 5/2004 | Daude et al. | |
| 2004/0243853 A1* | 12/2004 | Swander | H04L 63/061 726/14 |
| 2007/0168655 A1* | 7/2007 | Thomasson | H04L 63/0428 713/151 |
| 2007/0186281 A1* | 8/2007 | McAlister | H04L 63/20 726/14 |
| 2009/0063706 A1 | 3/2009 | Goldman et al. | |
| 2011/0158248 A1* | 6/2011 | Vorunganti | H04L 47/20 370/412 |
| 2011/0314286 A1* | 12/2011 | Tie | H04L 63/1466 713/171 |
| 2012/0017080 A1* | 1/2012 | Liu | H04L 9/3242 713/155 |
| 2012/0201124 A1 | 8/2012 | Marques et al. | |
| 2012/0278804 A1* | 11/2012 | Narayanasamy | H04L 47/15 718/1 |
| 2013/0322453 A1* | 12/2013 | Allan | H04L 12/4633 370/395.53 |
| 2014/0115182 A1* | 4/2014 | Sabaa | H04L 67/1097 709/232 |
| 2015/0172132 A1* | 6/2015 | Tessmer | H04L 12/4633 370/390 |
| 2015/0172165 A1* | 6/2015 | Tessmer | H04L 12/1886 370/254 |
| 2015/0280928 A1* | 10/2015 | Tessmer | H04L 12/4641 370/390 |
| 2015/0379282 A1* | 12/2015 | Thota | G06F 21/568 713/189 |
| 2016/0094366 A1* | 3/2016 | Wang | H04L 12/4625 370/401 |
| 2016/0149724 A1* | 5/2016 | Wang | H04L 12/46 370/392 |
| 2016/0294731 A1 | 10/2016 | McDaniel et al. | |
| 2016/0344628 A1 | 11/2016 | Hocker et al. | |
| 2016/0381015 A1* | 12/2016 | Ravinutala | H04L 63/0272 726/7 |
| 2017/0201389 A1* | 7/2017 | Tiruveedhula | H04L 12/1886 |
| 2017/0310582 A1* | 10/2017 | Anand | H04L 12/4633 |
| 2018/0123827 A1 | 5/2018 | Josyula | |
| 2018/0139176 A1 | 5/2018 | Sato | |
| 2019/0007301 A1* | 1/2019 | Kadosh | H04L 45/745 |
| 2019/0132241 A1* | 5/2019 | Vattem | H04L 12/4641 |

\* cited by examiner

US 11,316,837 B2

SUPPORTING UNKNOWN UNICAST TRAFFIC USING POLICY-BASED ENCRYPTION VIRTUALIZED NETWORKS

CROSS-REFERENCE TO RELATED APPLICATIONS

This application is a continuation of U.S. application Ser. No. 15/675,482, filed Aug. 11, 2017, which claims the benefit of U.S. Provisional Patent No. 62/534,565, filed Jul. 19, 2017, the entire contents of each of which are incorporated by reference herein.

BACKGROUND

In virtualized computing systems, host machines generally host a plurality of virtual machines. In hosting virtual machines, a host machine may provide a virtual switch that connects virtual machines running on the host to communicate with other virtual machines hosted on the same host machine as well as virtual machines hosted on other hosts. For example, the virtual machines may be interconnected as part of a logical overlay network. Logical overlay networks may be implemented by the host by encapsulating egress packets from the virtual machines and decapsulating ingress packets. For example, Virtual Extensible Local Area Network (VXLAN) tunnel endpoint (VTEP) services for encapsulating packets may be implemented at each host or at a gateway. Edge VTEPs or hypervisor-based VTEPs are generally connected to virtual switches implemented by the hypervisor for virtual machines on the same physical host. While the term "VTEP" refers to "VXLAN" tunneling protocol, it is now often used regardless of the tunneling protocol. The host may refer to internally-maintained forwarding tables that are populated by a control plane for determining whether to encapsulate packets and the targets of the encapsulation header based on the destination address of the original packet's header.

For example, a source virtual machine may generate an IP/MAC packet with the address of the source virtual machine set as the source address and the address of the destination virtual machine on a different host set as the destination address. The source virtual machine may send the packet to a virtual switch implemented on the same physical host as the source virtual machine. The virtual switch may, in accordance with forwarding tables associated with the virtual switch, be connected to a VTEP, which encapsulates the packet received from the source virtual machine to generate an encapsulated packet. The original packet may be referred to as an inner packet, and the encapsulated packet may be referred to as an outer packet. Further, a header of the inner packet including the address of the source virtual machine set as the source address and the address of the destination virtual machine set as the destination address may be referred to as an inner header. The VTEP may further include an outer header as part of the outer packet. The outer header may include a source address of the VTEP (e.g., source VTEP) generating and transmitting the encapsulated packet, and further may include a destination address of a VTEP (e.g., destination VTEP) associated with the destination virtual machine. Accordingly, in the overlay network, the outer header is used to forward the encapsulated packet through the overlay network from the source VTEP to the destination VTEP. The destination VTEP may then extract the inner packet and forward the original packet to a virtual switch connected to the destination VTEP, which forwards the original packet to the destination virtual machine based on the inner header of the decapsulated original packet.

However, in some cases, the packet that the source virtual machine generates may be an unknown unicast packet, which refers to a packet without the destination virtual machine's MAC address. In such cases, the host machine running the source virtual machine may send the unknown unicast packet to another host machine that replicates the unknown unicast packet and sends each replicated unknown unicast packet to other host machines within a logical overlay network or a logical layer-2 network/broadcast domain within the logical overlay network. In some cases, it may be desirable to secure the transmission of unknown unicast packets between the host machines using the IP security (IPsec) protocol, and more specifically, using distributed network encryption (DNE), which is a functionality created within a virtualized network environment to simplify key management associated with IPsec. Certain aspects of DNE are described in U.S. Pat. No. 9,613,218, which is hereby expressly incorporated by reference in its entirety.

SUMMARY

Herein described are one or more embodiments of a method for securely communicating an unknown unicast packet. The method includes storing, at a first host machine, a key policy exclusively for communication of unknown unicast (UU) packets with a group of host machines within a network. The method also includes receiving, at the first host machine, a UU packet. The method also includes negotiating a session key with a second host machine using the key policy. The method also includes encrypting the UU packet using the session key. The method also includes transmitting the encrypted UU packet to the second host machine.

Also described herein are embodiments of a non-transitory computer readable medium comprising instructions to be executed in a computer system, wherein the instructions when executed in the computer system perform a method described above for securely communicating an unknown unicast packet.

Also described herein are embodiments of a computer system, wherein software for the computer system is programmed to execute the method described above for securely communicating an unknown unicast packet.

DETAILED DESCRIPTION

Figure 1:
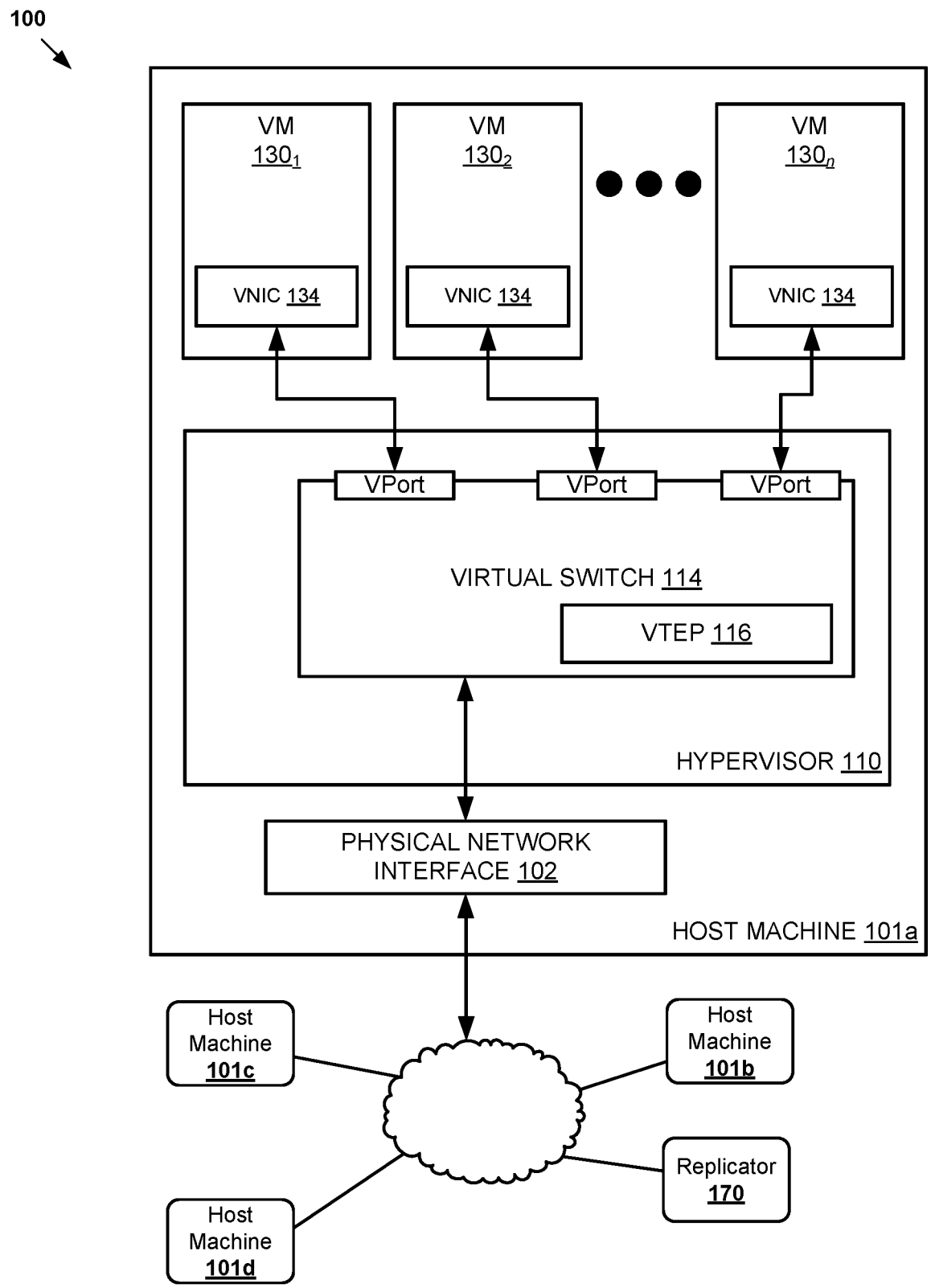
FIG. 1 is a block diagram of a network in which one or more embodiments of the present invention may be implemented.

FIG. 1 is a block diagram of a network 100 in which one or more embodiments of the present invention may be implemented. It should be understood that network 100 may include additional and/or alternative components than that shown, depending on the desired implementation. Network 100 includes one or more host machines 101, including host machine 101a.

As illustrated, host machine 101a includes a physical network interface (PNIC) 102, a hypervisor 110, and a plurality of virtual machines (VMs) 130. Host machine 101a may provide part of a computing infrastructure including multiple host machines for implementing a logical overlay network. Though not shown, host machines 101b-101d may include similar components as host machine 101a. In addition, each one of host machines 101b-101d may similarly host a plurality of virtual machines that may communicate with each other as well as VMs 130 of host machine 101a through network 100, as described below.

Though certain embodiments are described herein with respect to VMs, the same principals and techniques may also apply to other appropriate virtual computing instances (e.g., containers (e.g., Docker containers), data compute nodes, isolated user space instances, namespace containers, etc.). As shown, hypervisor 110 and the plurality of virtual machines 130 reside on host machine 101a. In certain embodiments, host machine 101a is a hardware computing platform (e.g., a server, workstation, etc.). Although not shown in FIG. 1, host machine 101a may include one or more central processing units (CPUs), system memory, and non-volatile data storage, in addition to one or more network interfaces, such as PNIC 102, for communicating with other hardware computing platforms, entities, or host machines on a physical network accessible through physical network interface 102.

Hypervisor 110 includes a virtual switch 114, which serves as an interface between the hosted virtual machines 130, PNIC 102, as well as other physical resources available on host machine 101a. Hypervisor 110 further includes a hypervisor-based Virtual Extensible Local Area Network (VXLAN) tunnel endpoint (VTEP) 116 which may be implemented in software by virtual switch 114 (or outside of virtual switch 114 and functionally coupled to virtual switch 114 using forwarding tables). Accordingly, VTEP 116 is responsible for providing VTEP services for each of the VMs 130 on the same host machine 101a as VTEP 116. In alternate embodiments, virtual switch 114, VTEP 116, and/or physical device drivers may execute in a privileged virtual machine often referred to as a "Domain zero", "root-", or "parent—partition." Each of the virtual machines 130 includes a virtual network interface card (VNIC) 134, which is responsible for exchanging packets between the virtual machine 130 and hypervisor 110. VNICs 134 may be, in some cases, a software abstraction of a physical network interface card. Each virtual machine 130 is connected to a virtual port (vport) provided by virtual switch 114, and virtual switch 114 is connected to physical network interface 102 to allow network traffic to be exchanged between virtual machines 130 executing on host machine 101a and other network destinations such as virtual machines hosted by other host machines (e.g., host machines 101b-101d). Virtual switch 114 may serve as a physical network switch, i.e., serve as an edge device on the physical network, but implemented in software.

As an example, a source virtual machine (e.g., VM 1301) hosted by source host machine 101a may generate an IP/MAC packet with the address (e.g., media access control (MAC) address and/or internet protocol (IP) address) of the source virtual machine designated as the source address and the address (e.g., MAC address and/or IP address) of the destination virtual machine on a destination host machine (e.g., host machine 101b) designated as the destination address. The source virtual machine may then send the generated packet to virtual switch 114 implemented in hypervisor 110. Having received the packet, virtual switch 114 then utilizes VTEP 116 to encapsulate the packet received from the source virtual machine to generate an encapsulated packet.

The original packet generated by the source virtual machine may be referred to as an inner packet, and the encapsulated packet may be referred to as an outer packet. Further, a header of the inner packet including the address of the source virtual machine, set as the source address, and the address of the destination virtual machine, set as the destination address, may be referred to as an inner header. When encapsulating the packet, the source VTEP (e.g., VTEP 116 of source host machine 101a) may further generate an outer header as part of the outer packet. The outer header may include a source address of the source VTEP as well as a destination address of a VTEP (e.g., destination VTEP) associated with the destination virtual machine (e.g., a virtual machine running on host machine 101b). Accordingly, in the overlay network, the outer header is used for forwarding the encapsulated packet through the overlay network from the source VTEP to the destination VTEP. After encapsulating the packet, in some embodiments, virtual switch 114 may then pass the encapsulated packet to the network layer of hypervisor 110 for encrypting the packet utilizing a security protocol implemented therein, such as the IP security protocol (IPsec), as further discussed herein. The network layer then sends the encapsulated packet to PNIC 102 for transmission to the destination host machine running the destination virtual machine.

Once the destination host machine receives the encrypted and encapsulated packet, its network layer decrypts it utilizing the IPsec protocol and passes it to the destination virtual switch implementing the destination VTEP. The destination VTEP then extracts the inner packet and uses the inner header of the decapsulated original packet to forward the original packet to the destination virtual machine. For example, the inner header of the decapsulated original packet may contain a MAC address of the destination virtual machine that the destination VTEP may use to forward the packet to the destination virtual machine.

In certain aspects, each of VMs 130 on host machine 101a as well as VMs on the other host machines (e.g., host machine 101b-101d) in network 100 may be configured in the logical overlay network as connected to the same "logical switch," meaning that VMs 130 on host machine 101a as well as VMs on the other host machines are part of the same logical layer-2 network/broadcast domain in the logical overlay network. The logical layer-2 network/broadcast domain may be identified by a network identifier (e.g., VXLAN network identifier (VNI)). In certain aspects, when generating packets, the source virtual machine (e.g., virtual machine 1301 on source host machine 101a) may have the IP address of the destination virtual machine, but not its MAC address. In general, a unicast packet for a destination virtual machine generated without the MAC address of the destination virtual machine may be referred to as an unknown unicast ("UU") packet.

Accordingly, a virtual machine 1301 of host machine 101a may generate a UU packet and send it to virtual switch 114. The UU packet may include a source MAC and IP address of virtual machine 1301, and a destination IP address of a destination virtual machine on another host machine, such as host machine 101b. The virtual switch 114 may identify the unicast packet as a UU packet based on the unicast packet not including a destination MAC address, or including a destination MAC address that is not included in the forwarding table of virtual switch 114. Virtual switch 114 may be configured to forward UU packets to a replicator 170 (e.g., based on forwarding tables stored at host machine 101a, which have replicator 170 as the next hop for UU packets, as discussed herein). Accordingly, VTEP 116 of virtual switch 114 encapsulates the UU packet by creating an outer packet header that includes a source address of VTEP 116, a destination address of a VTEP of replicator 170, and a network identifier of the logical layer-2 network/broadcast domain of virtual machine 1301. Virtual switch 114 then sends the encapsulated UU packet to the network layer of hypervisor 110 to encrypt the UU packet using the IPsec protocol and then the encrypted encapsulated packet is sent to PNIC 102 for transmission to replicator 170. In some embodiments, replicator 170 is a host machine similar to host machines 101a-101d that is configured by a central controller (e.g., control plane 210), as further discussed herein, to replicate and send UU packets to other host machines hosting VMs in the same layer-2 network/broadcast domain as virtual machine 1301. VTEP of replicator 170 may be configured to be used as a multicast tunnel endpoint (MTEP) for encapsulating and sending data packets to several host machines at the same time. In certain embodiments, any host machine in network 100 may be configured by the central controller to act as a replicator.

Upon receiving the encrypted encapsulated UU packet, replicator 170 decrypts the encapsulated packet using the IPsec protocol, decapsulates the encapsulated packet, and then replicates the inner packet for transmission to a number of host machines 101 with a VM in the logical layer-2 network/broadcast domain identified by the network identifier in the outer header of the encapsulated packet (e.g., based on forwarding tables stored at replicator 170 which indicate VTEPs associated with the logical layer-2 network/ broadcast domain, which may be configured by a central controller as discussed herein). Subsequently, replicator 170 encapsulates each replicated packet and stores in the outer header of each encapsulated replicated packet a source MAC address and source IP address of the replicator's VTEP, and a destination IP address and destination MAC address of the destination VTEP on each of the number of host machines 101. Replicator 170 further includes a network identifier in the outer header that identifies the logical layer-2 network/ broadcast domain of virtual machine 1301. For example, for one encapsulated replicated packet, replicator 170 includes in the outer header a destination IP address and MAC address of VTEP 116 of host machine 101b. Replicator 170 then encrypts each replicated packet using the IPsec protocol and sends the encrypted encapsulated packet to the corresponding host machine 101.

Each one of the number of host machines 101 then receives the encrypted encapsulated replicated packet via its corresponding PNIC and decrypts it using the IPsec protocol in its network layer. The network layer of each host machine 101 then passes the encapsulated packet to its VTEP, which decapsulates the encapsulated packet and sends the inner packet to the corresponding virtual switch on host machine 101 for the logical layer-2 network identified by the network identifier in the outer header of the encapsulated packet. If the destination MAC address of the packet is not in the forwarding tables of the virtual switch, the virtual switch may determine that the packet is a UU packet. Accordingly, the virtual switch sends the packet to all the virtual machines in the logical layer-2 network connected to the virtual switch on host machine 101. Any VMs receiving the packet with a different IP address than the destination IP address of the packet ignore the packet. However, the VM having the IP address corresponding to the destination IP address of the packet receives and accepts the packet. If the destination MAC address is present in the inner packet of the inner packet is recognized by the virtual switch, it will forward the packet out the virtual port corresponding with the destination MAC according to its forwarding table.

The embodiments described above illustrate an example of how the IPsec protocol is used for securing the transmission and reception of the UU packet by a number of host machines (e.g., source host machine 101a, replicator 170, and other host machines 101). The IPsec protocol is generally used to enable virtual machines residing on different host machines within a network (e.g., network 100) to communicate data packets among each other in a secured fashion. Before any data can be securely transferred using the IPsec framework, however, security associations need to be established between the two host machines. Each security association is a one-way or simplex connection, and therefore at least two security associations, one for each direction, are established between two IPsec peers (e.g., two host machines). These security associations are a form of contract between the host machines on how to exchange and protect information among each other. In some embodiments, each security association is comprised of a mutually agreed-upon session key, one or more security protocols, and a security parameter index (SPI) value.

In some cases, in order for a security association to be established between two host machines, a two-phase IPsec Key Exchange (IKE) operation is performed. Confidentiality and authentication are ensured during each phase by the use of encryption and authentication algorithms that are agreed upon by the two host machines during the security negotiations.

During IKE's phase one, which may be referred to as the "main mode SA," the two host machines perform a procedure to establish a secure and authenticated channel. More specifically, the two host machines first engage in policy negotiations and agree upon a number of parameters to be used for generating a shared master key. For example, the parameters may include an encryption algorithm, a hash algorithm, an authentication method, a Diffie-Hellman (DH) group to be used for key generation, etc. Next, the two virtual machines may exchange additional information required by a DH key determination algorithm to each generate the same master key. Using the master key as well as one or more parameters exchanged during the policy negotiations, the two host machines then attempt to authenticate each other's identities in a secured and encrypted fashion.

Once the identities of the two host machines are authenticated, they may start the second phase of IKE's operation to establish two security associations among each other. During the second phase, which may be referred to as the "quick mode SA," the two host machines negotiate a number of parameters for securing data transfer among each other. For example, the parameters may include one or more IPsec protocols, a hash algorithm for integrity and authentication, and an algorithm for encryption, if necessary. What results from the negotiation of the parameters above is the generation of two security associations (i.e., one inbound and one outbound) each having a different session key, one or more IPsec protocols, and an SPI value. These security associations are then stored locally at each host machine in a security association data base.

Each session key is used by a source host machine to encrypt data packets for transmission to a destination host machine, which then uses the same session key to decrypt the data packets received from the source host machine. In addition, the IPsec protocols may include an Authentication Header (AH) protocol and/or an Encapsulating Security Payload (ESP) protocol, which may be used to protect the transmission of data packets. In addition to the session key and the one or more IPsec protocols, each security association also includes an SPI value. In some embodiments, each SPI value is a binary string of numbers attached to a security association, which enables a host machine to distinguish among multiple active security associations. As an example, SPI values may be used to distinguish between a security association established between host machines 101a and 101b and a security association established between host machines 101a and 101c. Accordingly, when a data packet is generated by a VM 130 of host machine 101a that has a destination IP/MAC address corresponding to a VM running on host machine 101b, host machine 101a uses the outbound security association established between the two host machines to encapsulate and encrypt the data packet for transmission to host machine 101b. At the other end, when host machine 101b receives the data packet, it refers to the SPI value to determine which security association, and thereby which session key, has been used to encrypt the data packet. After identifying the correct security association in its security association data base, host machine 101b then decrypts the data packet using the corresponding session key.

In some embodiments, instead of using IKE, distributed network encryption (DNE) may be utilized to simplify key management associated with IKE in a network. DNE allows users (e.g. network administrators) to define and input simple security rules and key policies into a central controller (e.g., control plane 210 of FIG. 2) through an interface of a manager entity (e.g., management plane 205), which may be a physical computing device or a virtualized computing instance supported by a physical computing device. For example, in some embodiments, the central controller may store, in its memory, a plurality of security rules and key policies. In such an example, a security rule may designate a certain key policy to be assigned by the central controller for protecting data transmission between certain host machines in a network. As an example, the central controller may store key policies 1, 2, 3, etc. A user-defined security rule may then indicate that key policy 1 may be used to protect traffic going from the VMs on host machine 101a to the VMs on host machines 101b and that key policy 2 may be used for securing data traffic between host machines 101c and 101d.

In some embodiments, each key policy may include certain specifications that define properties of a master key. In some embodiments, a specification may be an algorithm, action, and/or strength of the master key. In some embodiments, the key policy may include the master key itself. In the example above, having identified that key policy 1 has been designated by the security rules to protect data traffic between host machine 101a and host machine 101b, the central controller then transmits key policy 1 to those host machines 101a and host machine 101b.

Host machines 101a and 101b then use key policy 1, and the master key specifications included therein, to generate a shared master key for negotiating session keys and establishing security associations for encrypting and decrypting data packets communicated among each other. In embodiments where the shared master key is included in the key policy, host machines 101a and 101b use the master key for negotiating session keys and establishing security associations without having to generate the master key.

Using DNE, therefore, helps simplify key management, whereby instead of occupying the host machines, or the virtual machines running thereon, with having to engage in the IKE operations, each host machine (or virtual machine running thereon) may be assigned a key policy (having a master key or information for the generation of a master key) that the host machine then uses to negotiate session keys with certain other host machines for the transmission and reception of data packets. Accordingly, different key policies are each assigned to a group of host machines within the network thereby creating "microsegments" of host machines, where the host machines in each microsegment only receive the key policy associated with their microsegment, and master key for their use. Accordingly, a microsegment refers to a group of host machines in the network whose communications are encrypted, using a key policy associated with that microsegment, and therefore protected against other host machines in the network in other microsegments that do not have access to the same key policy. Using this approach, host machines in a microsegment may be protected from host machines in a different microsegment because the key policy for the microsegment is not broadcast to host machines in the other microsegment.

However, assigning a different key policy to different microsegments within a network may not be practical when some of the packets generated by virtual machines within the microsegment are UU packets. As described above, because any of the host machines within the network may be configured by the central controller to act as a replicator, any host machine may receive packets to be replicated from any other host machine, and further may need to transmit replicated packets to any number of other host machines in the network. Accordingly, each host machine would need to have key policies and master keys to negotiate session keys with every other host machine in the network to encrypt and decrypt data packets communicated with other host machines. However, each host machine having access to key policies and master keys to negotiate session keys with every other host machine in the network to communicate any type of traffic (e.g., unicast traffic, unknown unicast traffic, multicast traffic, broadcast traffic, etc.) violates DNE's principle of least privilege. In particular, according to the principle of least privilege host machines should only have access to key policies and master keys to negotiate session keys to communicate with certain other host machines the host machine needs to communicate with (e.g., for unicast traffic), and not all host machines in the network.

Accordingly, certain embodiments described herein relate to defining a key policy exclusively for UU packets that all host machines in the network may receive and use to securely transmit and receive UU packets. Such a key policy may only be used for unknown unicast traffic and not be used by the host machines for other types of traffic (e.g., unicast traffic with a known destination MAC address). Before describing the more detailed operations of how host machines receive and use such a key policy, however, network control system 200 is first described in FIG. 2 to illustrate how a key policy is generated and transmitted to the host machines etc.

Figure 2:
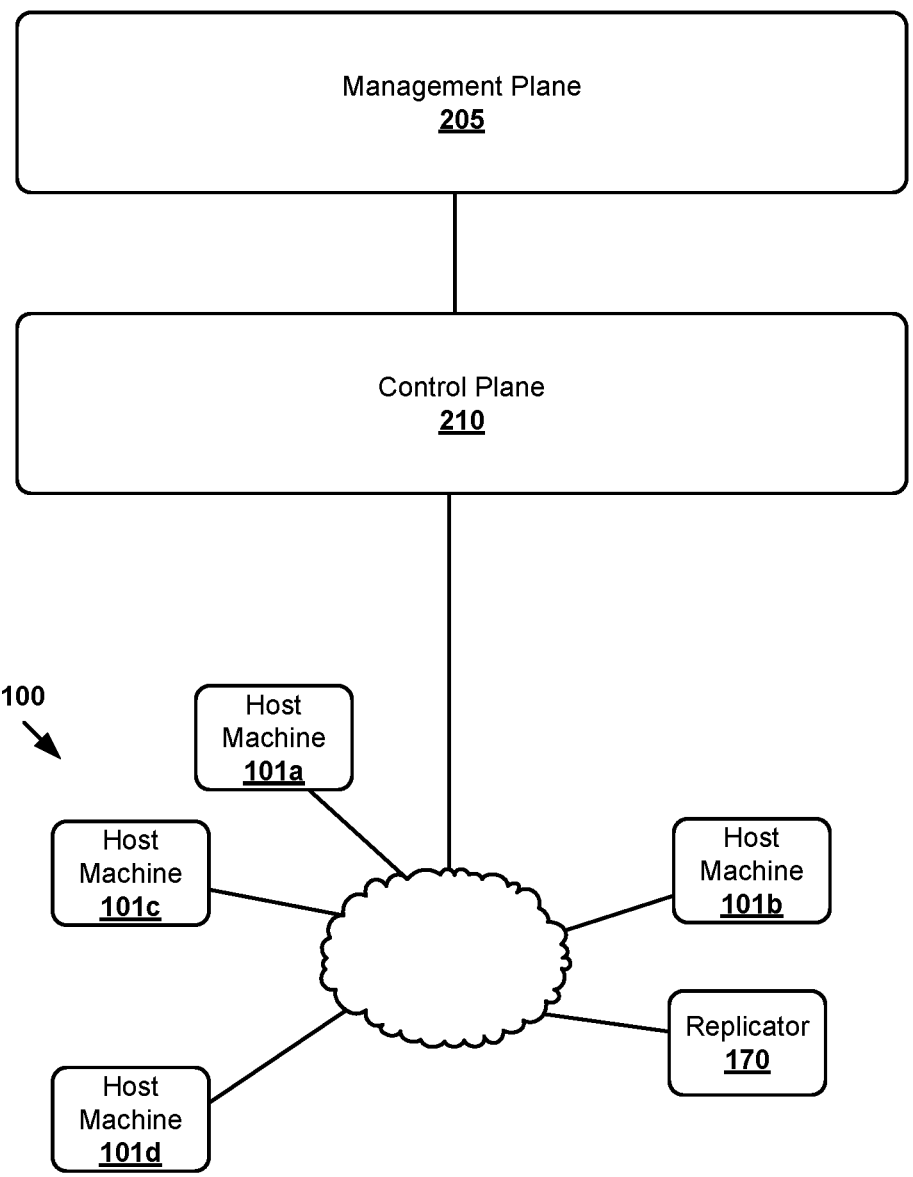
FIG. 2 is a block diagram of a network control system for the network of FIG. 1.

FIG. 2 is a block diagram of a network control system 200 for the network 100 of FIG. 1. Specifically, as shown, the network control system 200 includes a management plane 205 and a central control plane 210. Further, network control system 200 may include one or more local controllers (also called the local control plane) (not shown) that operate on host machines 101. Each local controller manages interactions between its corresponding host machine and control plane 210.

Though shown as single entities, it should be understood that both the management plane 205 and central control plane 210 may be implemented as distributed or clustered systems. That is, management plane 205 may include multiple computers that implement management plane functions, and central control plane 210 may include multiple controller computers or virtual machines or containers (or other logical compute instances) that implement central control plane functions. In some embodiments, one or more such centralized controllers includes both management plane and central control plane functions (e.g., as separate applications or functions).

In some embodiments, management plane 205 is responsible for receiving logical network configuration inputs (e.g., through an application programming interface). Users (e.g., network administrators) may further input logical network configuration data through, e.g., a command-line interface, a graphical user interface, etc. Each logical network configuration for each logical network, in some embodiments, may include data defining one or more VMs 130 and the connections between them. In some embodiments, as described below in relation to FIG. 3, a user may define and input a special key policy into management plane 205 for securing the communication of UU packets among host machines, or virtual machines running thereon. In some embodiments, management plane 205 may be configured to automatically define such a key policy without any user input. The key policy is exclusively defined for UU packets and not for any other types of packets. In some embodiments, a flag may be added to the key policy such that control plane 210 as well as the host machines 101 in network 100 are able to identify the key policy as one that has been exclusively defined for use in relation to UU packets.

Control plane 210 pushes information to host machines 101 and replicator 170. For example, after receiving the key policy defined for UU packets from management plane 205, control plane 210 may check the flag described above and determine that the key policy is for securely communicating UU packets among various host machines in network 100. In some embodiments, control plane 210 then pushes the key policy to all host machines (including replicator 170) within network 100. In some embodiments, control plane 210 pushes the key policy to all host machines 101 within network 100 even when no corresponding security rules exist or have been defined, or received for the key policy.

As another example, control plane 210 may be configured to push forwarding tables to host machines 101 and replicator 170, that may be used as discussed. The forwarding tables may, for example, indicate a next hop for UU packets, which VTEPs are associated with which logical layer-2 network/broadcast domain, which VTEPs are associated with which VMs, host machines, or physical servers, etc. In addition, the forwarding tables may direct that a UU packet received by a replicator, such as replicator 170, is to be sent to a number of host machines within the layer-2 network/broadcast domain.

In certain embodiments, a single host machine 101 is configured as a replicator 170 at a time by control plane 210 for a particular logical layer-2 network/broadcast domain. Accordingly, control plane 210 may configure virtual switches on host machines 101 to set the single replicator 170 as a next hop for UU packets. Further, control plane 210 may configure the single replicator 170 to replicate and send the replicated packets to each other host machine 101. In certain embodiments, the control plane 210 may change the replicator 170 from one host machine 101 to another, and update the configuration of the host machines 101 accordingly.

Though certain embodiments are described with respect to a single replicator 170, it should be noted that multiple replicators 170 may be used in a logical layer-2 network/broadcast domain. For example, multiple host machines 101 may be configured by control plane 210 as replicators 170 at a given time. In certain embodiments, control plane 210 may configure different virtual switches of different host machines 101 to set different replicators 170 as a next hop for UU packets. Accordingly, replication of packets may be distributed among different host machines 101, thereby distributing workload and not overloading a single host machine 101. In certain embodiments, control plane 210 may configure a virtual switch of a given host machine 101 to replicate and send a packet to multiple replicators 170, and each replicator 170 may be configured to replicate and send the packet to a different subset of host machines 101 in the network, again distributing workload and not overloading a single host machine 101. In particular, the packet may still reach each host machine 101, but different host machines 101 may receive the packet from different replicators 170.

Figure 3:
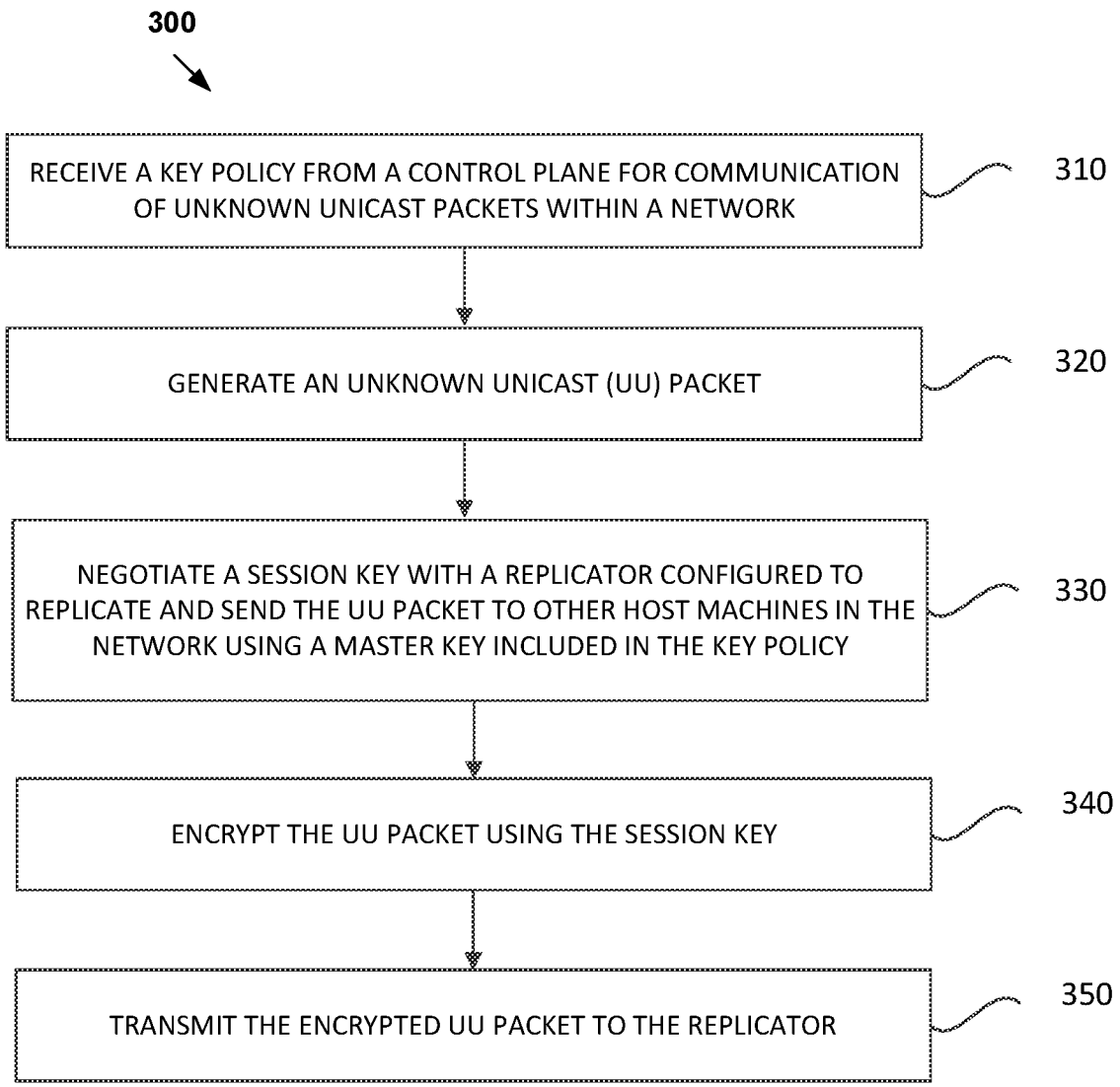
FIG. 3 illustrates example operations for use by a host machine to securely transmit an unknown unicast packet to a replicator.

FIG. 3 illustrates example operations 300 for use by a host machine to securely transmit a UU packet to a replicator.

At 310, a source host machine, such as host machine 101*a*, receives a key policy from control plane 210 for the communication of UU packets within network 100. As described above, the key policy is defined exclusively for UU packets and is pushed by control plane 210 to all host machines within the network. As described above, the key policy, in some embodiments, may include certain specifications that may be used to generate a shared master key. In some other embodiments, as described above, the key policy may include the actual master key.

At 320, host machine 101*a* generates a UU packet. More specifically, the UU packet is generated by a source virtual machine, such as VM 1301, running on host machine 101*a*. As described above, VM 1301 sends the UU packet to virtual switch 114 of host machine 101*a*, which identifies the packet as a UU packet and therefore determines that the next hop for the UU packet is replicator 170. Subsequently, VTEP 116 within virtual switch 114 encapsulates the packet to send to replicator 170. The network layer of hypervisor 110 of host machine 101*a* then receives the encapsulated UU packet and initiates establishing security associations with replicator 170 for transmitting the UU packet to replicator 170 in an IPsec secured manner.

At 330, host machine 101*a* negotiates a session key with replicator 170. More specifically, host machine 101*a* and replicator 170 use the information included in the key policy they received from control plane 210 exclusively for UU packets to generate a master key based on the packet being a UU packet. Further, using the master key, host machine 101*a* and replicator 170 negotiate a session key for communicating the packet from host machine 101*a* to replicator 170. In some embodiments, the session key may be generated based on a function (e.g., as included in the key policy) of the master key and information relating to the source VTEP (e.g., VTEP 116 of host machine 101*a*) and the destination VTEP (e.g., of replicator 170) of the packet. As an example, in some embodiments, the master key may be a password to which an ID number of the source VTEP and an ID number of the destination VTEP, among other things, may be appended to generate a session key.

At 340, the network layer of host machine 101a encrypts the encapsulated UU packet using the session key that was negotiated in step 330. In some embodiments, the network layer may perform the encryption using one or more of the IPsec protocols described above. For example, the network layer may use the ESP protocol to encrypt the inner header of the UU packet (e.g., including the IP/MAC address of the source virtual machine and the IP address of the destination virtual machine) as well as the payload of the UU packet. Using the ESP protocol, the network layer may further encapsulate the UU packet by appending an ESP header as well as an encrypted ESP trailer to the UU packet.

At 350, host machine 101a then transmits the encrypted encapsulated UU packet to replicator 170. More specifically, after encrypting the encapsulated UU packet, the network layer sends it to PNIC 102 for transmission to replicator 170 over network 100.

Figure 4:
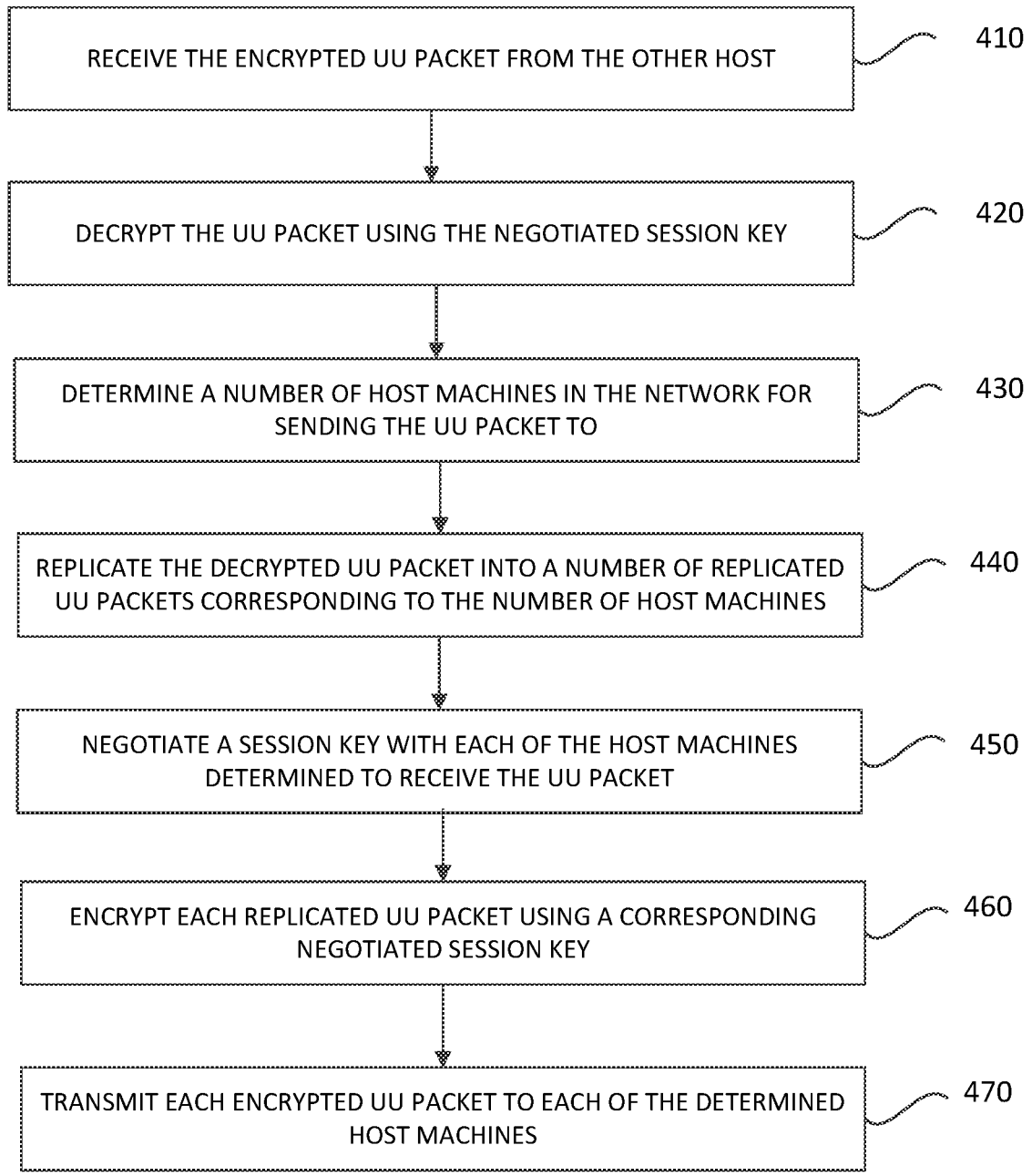
FIG. 4 illustrates example operations for use by a replicator to securely transmit unknown unicast packets to a number of host machines.

FIG. 4 illustrates example operations 400 for use by a replicator (e.g., replicator 170) to receive the UU packet, replicate it, and send each replicated UU packet to host machines within the logical layer-2 network, using a different session key for encrypting each replicated UU packet.

At 410, replicator 170 receives the encrypted encapsulated UU packet from host machine 101a.

At 420, replicator 170 decrypts the encrypted encapsulated UU packet using the negotiated session key as described in relation to step 330 of FIG. 3. For example, replicator 170 uses the same session key for decrypting the payload as well as the inner header of the encapsulated UU packet's inner packet. Replicator 170 then decapsulates the UU packet by stripping off the outer header as well as any IPsec header and trailer (e.g., ESP header and trailer) resulting in a remaining inner packet. Based on the destination MAC address in the inner header of the UU packet, replicator 170 determines that the packet is a UU packet and consults the forwarding tables, received from controller 210, to determine to which host machines to send the UU packet.

At 430, replicator 170 determines a number of host machines in the network for sending the UU packet to. As described above, replicator 170 makes this determination based on the forwarding tables, which may direct a replicator to send a UU packet to some or all host machines running virtual machines that are part of the layer-2 network/broadcast domain.

At 440, replicator 170 replicates the UU packet into a number of replicated UU packets corresponding to the number of determined host machines.

At 450, replicator 170 then negotiates a session key with each of the host machines determined to receive the UU packet as described in relation to step 330 of FIG. 3. For example, as discussed replicator 170 also receives a key policy from control plane 210 for the communication of UU packets within network 100 and utilizes the key policy for negotiation session keys. Negotiating a session key with each of the host machines is performed as a step during the process of establishing security associations with each of the host machines.

At 460, replicator 170 encrypts each replicated UU packet using a corresponding negotiated session key. More specifically, prior to encrypting each replicated UU packet, VTEP 116 (which is used as an MTEP for multicasting) of replicator 170 first encapsulates each replicated UU packet based on information relating to the destination host machine as identified by the forwarding tables. Next, each encapsulated packet may be passed on to the network layer of hypervisor 110 of replicator 170, where the IPsec protocol is implemented. The network layer then encrypts each packet based on its destination host machine by using a session key negotiated with that particular host machine. For example, replicator 170 may have negotiated session keys B, C, and D with host machines 101b, 101c, and 101d, respectively. In such an example, the network layer encrypts the first, second, and third replicated UU packets with session keys B, C, and D for transmission to host machines 101b, 101c, and 101d, respectively.

At 470, replicator 170 transmits each encrypted encapsulated UU packet to each of the corresponding host machines. More specifically, after encryption, the network layer sends each UU packet to PNIC 102 of replicator 170, which then transmits the UU packets to their corresponding destination host machines.

Subsequently, each host machine 101 receives the replicated UU packet from PNIC 102 of replicator 170 and the receiving network layer decrypts the UU packet using the corresponding negotiated session key. For example, after receiving the encrypted encapsulated UU packet, the network layer of host machine 101b decrypts the encapsulated UU packet with session key B that was negotiated with replicator 170 and then sends the decrypted encapsulated UU packet to its VTEP 116 for decapsulation. VTEP 116 sends the decapsulated packet to its virtual switch 114, which based on the destination MAC address indicating the packet is a UU packet, sends the packet to all the virtual machines in the logical layer-2 network connected to the virtual switch on host machine 101. Any VMs 130 receiving the packet with a different IP address than the destination IP address included in the header of the packet ignore the payload. However, a VM having the same IP address receives the packet in order to process the payload.

In some embodiments, as discussed, instead of transmitting the UU packet to only one replicator 170, the source host machine (e.g., host machine 101a in the embodiments of FIGS. 3-4) may itself replicate and transmit each replicated UU packet to a number of replicators 170. In such embodiments, the forwarding tables received by the host machines 101 may have a number of replicators 170 as the next hops for UU packets. Accordingly, in such embodiments, each UU packet is encapsulated and also encrypted using a different session key negotiated with each replicator 170.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers." OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims.

In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for use by a first host machine for securely communicating packets, the method comprising:
    storing, at the first host machine, a shared key policy comprising a master key or information for use in generating the master key, wherein the master key is exclusively for communication of certain one or more types of packets with a group of host machines within a network, wherein one or more destination media access control (MAC) addresses of the certain one or more types of packets are not included in a forwarding table of a virtual switch on the first host machine, and wherein the shared key policy is shared by the first host machine and the group of host machines;
    receiving, at the virtual switch, a packet of the certain one or more types of packets on a logical overlay layer 2 network, wherein a destination MAC address of the packet is not included in the forwarding table of the virtual switch;
    negotiating one or more session keys with a plurality of host machines in the group of host machines using the shared key policy;
    replicating the packet to produce a plurality of packets;
    encrypting the plurality of packets using the one or more session keys; and
    transmitting the encrypted plurality of packets to the plurality of host machines.

2. The method of claim 1, wherein the first host machine receives the packet from a source virtual machine on the first host machine.

3. The method of claim 1, wherein the packet is an unknown unicast (UU) packet, and wherein:
    the one or more session keys comprise a number of session keys, each of the number of session keys corresponding to a different one of the plurality of host machines; and each of the plurality of packets is encrypted with a different session key from the number of session keys.

4. The method of claim 1, wherein the one or more session keys are generated based on the master key.

5. The method of claim 1, wherein the shared key policy includes a flag for use by the group of host machines to identify the shared key policy for exclusively communicating the certain one or more types of packets.

6. The method of claim 1, wherein the shared key policy is transmitted by a central controller to all host machines in the group of host machines.

7. The method of claim 1, wherein the shared key policy is generated automatically by a manager entity.

8. A non-transitory computer readable medium having instructions stored thereon that, when executed by a first computer system, cause the first computer system to perform a method comprising:
   storing, at the first computer system, a shared key policy comprising a master key or information for use in generating the master key, wherein the master key is exclusively for communication of certain one or more types of packets with a group of computer systems within a network, wherein one or more destination media access control (MAC) addresses of the certain one or more types of packets are not included in a forwarding table of a virtual switch on the first computer system, and wherein the shared key policy is shared by the first computer system and the group of computer systems;
   receiving, at the virtual switch, a packet of the certain one or more types of packets on a logical overlay layer 2 network, wherein a destination MAC address of the packet is not included in the forwarding table of the virtual switch;
   negotiating one or more session keys with a plurality of computer systems in the group of computer systems using the shared key policy;
   replicating the packet to produce a plurality of packets;
   encrypting the plurality of packets using the one or more session keys; and
   transmitting the encrypted plurality of packets to the plurality of computer systems.

9. The non-transitory computer readable medium of claim 8, wherein the first computer system receives the packet from a source virtual machine on the first computer system.

10. The non-transitory computer readable medium of claim 8, wherein the packet is an unknown unicast (UU) packet, and wherein:
   the one or more session keys comprise a number of session keys, each of the number of session keys corresponding to a different one of the plurality of computer systems; and
   each of the plurality of packets is encrypted with a different session key from the number of session keys.

11. The non-transitory computer readable medium of claim 8, wherein the one or more session keys are generated based on the master key.

12. The non-transitory computer readable medium of claim 8, wherein the shared key policy includes a flag for use by the group of computer systems to identify the shared key policy for exclusively communicating the certain one or more types of packets.

13. The non-transitory computer readable medium of claim 8, wherein the shared key policy is transmitted by a central controller to all computer systems in the group of computer systems.

14. The non-transitory computer readable medium of claim 8, wherein the shared key policy is generated automatically by a manager entity.

15. A first computer system, comprising:
   a memory comprising executable instructions; and
   a processor in data communication with the memory and configured to execute the instructions to cause the first computer system to perform a method comprising:
      storing, at the first computer system, a shared key policy comprising a master key or information for use in generating the master key, wherein the master key is exclusively for communication of certain one or more types of packets with a group of computer systems within a network, wherein one or more destination media access control (MAC) addresses of the certain one or more types of packets are not included in a forwarding table of a virtual switch on the first computer system, and wherein the shared key policy is shared by the first computer system and the group of computer systems;
      receiving, at the virtual switch, a packet of the certain one or more types of packets on a logical overlay layer 2 network, wherein a destination MAC address of the packet is not included in the forwarding table of the virtual switch;
      negotiating one or more session keys with a plurality of computer systems in the group of computer systems using the shared key policy;
      replicating the packet to produce a plurality of packets;
      encrypting the plurality of packets using the one or more session keys; and
      transmitting the encrypted plurality of packets to the plurality of computer systems.

16. The first computer system of claim 15, wherein the first computer system receives the packet from a source virtual machine on the first computer system.

17. The first computer system of claim 15, wherein the packet is an unknown unicast (UU) packet, and wherein:
   the one or more session keys comprise a number of session keys, each of the number of session keys corresponding to a different one of the plurality of computer systems; and
   each of the plurality of packets is encrypted with a different session key from the number of session keys.

18. The first computer system of claim 15, wherein the one or more session keys are generated based on the master key.

19. The first computer system of claim 15, wherein the shared key policy includes a flag for use by the group of computer systems to identify the shared key policy for exclusively communicating the certain one or more types of packets.

20. The first computer system of claim 15, wherein the shared key policy is transmitted by a central controller to all computer systems in the group of computer systems.

* * * * *